United States Patent

McArdle

(10) Patent No.: US 8,364,018 B2
(45) Date of Patent: Jan. 29, 2013

(54) SELECTING OPTIONS LOCATED ON A MEDIA DISC

(75) Inventor: James M. McArdle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 12/720,211

(22) Filed: Mar. 9, 2010

(65) Prior Publication Data

US 2011/0222390 A1   Sep. 15, 2011

(51) Int. Cl.
*H04N 9/80* (2006.01)
*H04N 5/765* (2006.01)
*H04N 5/92* (2006.01)

(52) U.S. Cl. ......... 386/248; 386/200; 386/239; 386/244

(58) Field of Classification Search .......... 386/200–234, 386/239–248
See application file for complete search history.

(56) References Cited

U.S. PATENT DOCUMENTS

| 5,382,776 | A * | 1/1995 | Arii et al. ................ 235/375 |
| 7,410,099 | B2 * | 8/2008 | Fukasawa et al. ....... 235/462.09 |
| 2002/0070282 | A1 * | 6/2002 | Gotoh et al. .................. 235/494 |
| 2004/0167645 | A1 * | 8/2004 | Kimura ........................... 700/94 |
| 2004/0179810 | A1 |  9/2004 | Haussmann et al. |
| 2005/0046817 | A1 * | 3/2005 | Wolfe et al. ..................... 355/54 |

OTHER PUBLICATIONS

Pioneer, "DVD Player: DVD-V5000", 2004, Pioneer Corporation, title page, pp. 49-52, last page.*
IBM, "Barcodes Special codes on DVD disk control Playback", Jul. 14, 2008, 2 pgs.
"Method to dynamically program the behavior of a non-writeable media and leave it alterable", IBM Research Disclosure 429140, Jan. 2000, p. 178.

* cited by examiner

*Primary Examiner* — Thai Tran
*Assistant Examiner* — Hung Dang
(74) *Attorney, Agent, or Firm* — Yee & Associates, P.C.; Steven L. Bennett

(57) ABSTRACT

Selecting options on a media disc containing data is provided. An option identifier associated with an external surface of the media disc is detected by a sensor unit coupled to a media player. The external surface is an outer surface of the media disc. A presentation option corresponding to the option identifier is identified. Media content associated with the media disc is presented in a format corresponding to the presentation option.

11 Claims, 5 Drawing Sheets

SELECTING OPTIONS LOCATED ON A MEDIA DISC

BACKGROUND

1. Field

The disclosure relates generally to digital media and more specifically to an improved method and apparatus for selecting media options. Still more specifically, the present invention relates to a method and apparatus for selecting options associated with a media disc based on an orientation of a media disc.

2. Description of the Related Art

Digital versatile discs (DVDs) are commonly used storage devices for storing audio and/or video data, including movies, music, television programs, and documentaries. In today's global market, movies stored on DVD's are also oftentimes dubbed or translated into multiple languages, and/or contain subtitles in multiple language options for viewers.

A problem with the current configuration of DVDs is that even if the movie on the DVD is viewable in multiple languages, the menu is loaded onto the initial display screen for a viewer in the primary language that the movie was recorded in. Current configurations within media players present the viewer with a main menu wherein the viewer may scroll through a series of options and locate the option that the viewer desires to associate with the movie only after the DVD is loaded and playing.

Viewers who are unable to read and/or understand the language initially presented on the display screen may be forced to rely on assistance from others to identify language options and select the language option in which the user is comfortable.

For example, a viewer whose primary language is Japanese, and is unable to read and understand English, will not be able to understand the main menu options presented in English to identify and select a Japanese audio track and/or Japanese subtitles to view with the movie. The viewer will thus require assistance by others to understand the English instructions located on the display screen. If others who are able to understand the default language are unavailable, the viewer has to guess the desired language using trial and error. The difficulty that many users face using the currently available solutions, causes these users to be less inclined to use or purchase DVDs.

SUMMARY

The illustrative embodiments described herein provide a method and apparatus for selecting options on a media disc containing data. In one embodiment, an option identifier associated with an external surface of the media disc is detected by a sensor unit coupled to a media player. The external surface is an outer surface of the media disc. A presentation option corresponding to the option identifier is identified to form an identified presentation option. Media content associated with the media disc is presented in a format corresponding to the identified presentation option.

DETAILED DESCRIPTION

With reference now to the figures and in particular with reference to FIGS. 1-6, exemplary diagrams are provided in which illustrative embodiments may be implemented. It should be appreciated that FIGS. 1-6 are only exemplary and are not intended to assert or imply any limitation with regard to the environments in which different embodiments may be implemented. Many modifications to the depicted environments may be made.

Figure 1:
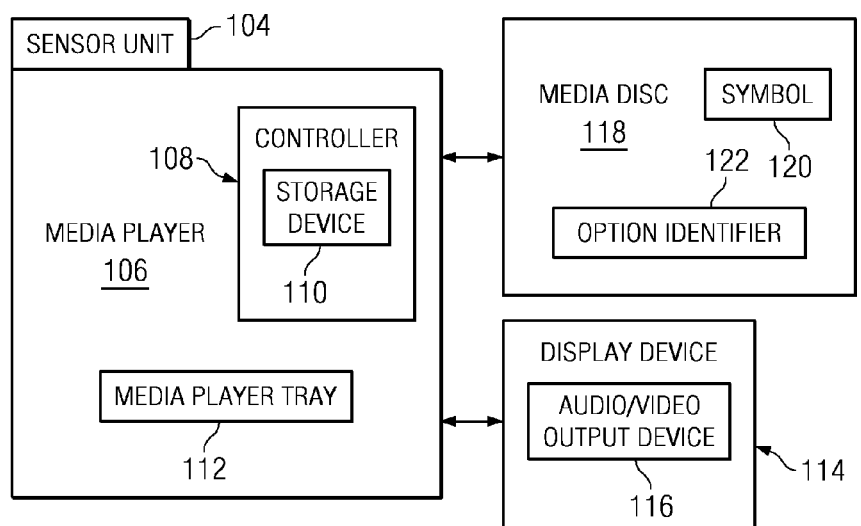
FIG. 1 is a block diagram of a media player and a media disc containing an option identifier in which illustrative embodiments may be implemented.

FIG. 1 depicts a block diagram of a media player in which illustrative embodiments may be implemented. Media disc 118 is a an example of a portable data storage device used for storing data, including, without limitation, audiovisual data, such as movies, television programs, graphical content, video games, music, and any other audio content and/or video content. Media disc 118 may be implemented as, for example, without limitation, a DVD, a recordable DVD, a rewritable DVD (DVD-RW), a DVD-video, a DVD-audio, recordable high definition digital versatile device (HD-DVD), rewritable HD-DVD, Blu-Ray Discs, video compact discs (VCDs), compact discs (CDs), rewritable compact discs (CD-RW), read only memory compact disc (CD-ROM), or any other type of disc containing audio and/or video content. Media disc 118 may also be implemented as non-optical discs, including without limitation, phonograph records or magnetic disks. Media disc 118 may be either single-sided, single layer, single side dual layer, double sided, single layer, double sided, dual layer on one side, single on another, or double sided, dual layer on both sides.

Media player 106 is a device capable of presenting the data stored on media disc 118, including audio and/or video data. Media player 106 may be a stand-alone device. Media player 106 may also be embedded within another device, such as, without limitation, a television, a stereo, an automobile or other vehicle, a desktop computer, a laptop computer, or any other type of computing device.

In this example, media player 106 is connected to display device 114 in order to display video content located on media disc 118. Display device 114 includes, but is not limited to, display devices such as televisions, high definition television (HD-TV), rear projection televisions, plasma screens, liquid crystal display (LCD) screens, projector screens, computer monitors, laptop monitors, and portable media players.

In this depicted embodiment, audio/video output device 116 is located in display device 114. However, audio/video output device 116 may also work separately from device display 114. Additionally, the video device may work separately from the audio device in an alternative embodiment. Audio/video output device 116 includes, but is not limited to, audio output devices such as speakers, surround sound systems, head phones, ear buds, and any other type of audio output device.

The components of media disc 118 include an option identifier 122. Option identifier 122 is a machine readable representation of information. Machine readable means that the information is readable by a device that includes a processor or other circuitry that performs functions, such as a computer, a DVD player, a digital music player, a portable data processing system, a cellular phone, or other data processing system.

Option identifier 122 includes, but is not limited to, a barcode pattern, an etching, and a dot pattern. A barcode stores data in the widths and spacing of printed parallel lines. A dot matrix stores information in patterns of dots, concentric circles, or text codes hidden within images. Option identifier 122 may be associated with any selectable feature for media player 106 to detect and automatically load on display device 114. Additionally, a media disc may contain multiple barcodes located on an external surface of the media disc.

Thus, the user is able to utilize a media disc containing the features pertinent to the user. These features present the user with a variety of options related to user desired languages, audio quality, audio presentation, image quality, and image presentation. Option identifier 122 may be in the form of a label located somewhere on an external surface of media disc 118. Option identifier 122 may be affixed to media disc 118 in multiple ways. The manner of affixing the option identifier, includes, but is not limited to, using adhesive on a removable label, etching the option identifier onto a surface of media disc 118, or printing the option identifier on media disc 118.

In this example, media disc 118 also includes symbol 120. Symbol 120 is a human readable symbol or representation of an option associated with option identifier 122. Symbol 120 may be, for example, without limitation, a flag of a nation, a flag of a state, a flag of a region, a word, one or more letters, one or more numbers, a picture, graphic icon, colors, or any combination of numbers, letters, icons, words, colors, or flags, and text with or without raised markings. A flag may indicate a language that is spoken in a nation, state, or region associated with the flag.

For example, if a user wants to watch a movie in Japanese using media player 106, a symbol of a Japanese flag located next to a barcode serving as option identifier 122, will assist the user in understanding which barcode to use on the media disc. Thus, the Japanese flag serves as symbol 120 in this example.

Sensor Unit 104 detects option identifier 122 and communicates the necessary instructions to controller 108 to control the presentation output on display device 114. Sensor unit 104 includes, without limitation, optical scanners that detect option identifier 122. In this depicted embodiment, sensor unit 104 is attached to media player 106. However, sensor unit 104 may also be separated from media player 106. If separated, sensor unit 104 includes, without limitation, portable barcode scanners.

Media disc 118 is placed on a media player tray, such as media player tray 112. Media player tray 112 communicates with controller 108. Controller 108 sends the instructions from storage device 110 to display device 114.

Media player tray 112 is located on media player 106. Media disc 118 is placed in media player tray 112 in order to present the data embedded on media disc 118. Media player tray 112 features include sliding in an open position and a closed position to allow a user to insert and remove media disc 118. Media player tray 112 may be controlled by devices, including, but not limited to, remote controllers and display devices, such as display device 114.

Additionally, media player 106 contains controller 108 and storage device 110. Controller 108 includes, but is not limited to, a processor, a programmable logic array (PLA) or an application-specific integrated circuit (ASIC). Controller 108 controls the operation of media player tray 112 and sensor unit 104.

Furthermore, controller 108 contains storage device 110. Storage device 110 stores instructions for controller 108. In some embodiments storage device 110 may be a separate component coupled to controller 108. Storage device 110 includes, but is not limited to, storage devices, such as a semiconductor or solid state memory, magnetic tape, a removable computer diskette, a random access memory (RAM), a read-only memory (ROM), a rigid magnetic disk and an optical disk, millipede storage technology, magneto-resistive random access memory (MRAM), or phase-change memory, also known as PCM, PRAM, Ovonic Unified Memory, and Chalcogenide RAM (C-RAM). Current examples of optical disks include compact disk-read only memory (CD-ROM), compact disk-read/write (CD R/W) and DVD.

In one embodiment, media disc 118 contains option identifier 122. Sensor unit 104 detects media disc 118 after the media disc is located within a proximity of sensor unit 104. Media disc 118 may be placed near sensor unit 104 in order for sensor unit 104 to detect option identifier 122. Sensor unit 104 communicates with controller 108 for instructions regarding option identifier 122. Media disc 118 is located in media player tray 112. Controller 108 sends signals to display device 114 and audio/video output device 116 regarding the presentation format for the option associated with option identifier 122. For example, if the option associated with option identifier 122 was closed captioning for the hearing impaired, then controller 108 would send signals to display device 114 and audio/output device 116 to display closed captioning when presenting the multimedia content located on media disc 118. Closed captioning is a way for viewers, who are often hearing impaired or simply may need assistance understanding the dialogue associated with the content of the media disc, to view text captions that transcribe speech and other sounds that are displayed on a display device, such as display device 114.

Media discs have the potential to hold many options for a user. The user can select an option based on the user's preferences. Additionally, media discs have the potential to hold many options depending on which side of the media disc is utilized and which features are indicated. However, the current solutions do not provide for this feature. Current solutions are, especially, lacking when the user is unable to understand the primary language associated with the media disc and instead requires assistance to present the media content located on the media disc. Thus, the illustrative embodiments recognize a need for a method for a media player that automatically detects an option associated with a media disc from the initial placement of the media disc in the media player, where an external marker is located on the media disc to enable the media player to automatically detect this option. Therefore, the illustrative embodiments provide a method for selecting and presenting options in a media player using an external option identifier.

In one embodiment, an option identifier is detected and associated with an external surface of the media disc by a sensor unit coupled to a media player. Next, a presentation option corresponding to the option identifier is identified. An external surface of the media disc comprises an outer surface of the media disc. A presentation option is an option for presenting audio and/or video content. A presentation option includes, without limitation, a language for the audio track, a language for subtitle, audio descriptive soundtracks for the blind, closed captioning for the hearing impaired, censured audio content for children and families, censured video content for children and families, and/or any other audio and/or video formats. Censured audio content may include soundtracks in which foul or offensive language has been replaced with milder language so as to be more appropriate for younger audiences. Censured video content may include video content in which violent or sexually explicit scenes are skipped so as to be more appropriate for younger audiences. In an embodiment with the presentation option of audio descriptive soundtracks for the blind, the media disc may have braille located on media disc 118 to assist in selecting an option identifier, such as option identifier 122. Braille is a method that is widely used by blind people to read and write. Each braille character or cell is made up of six dot positions, that are raised above a surface and arranged in a rectangle, containing two columns of three dots each. The dots correspond to letters and numbers and characters that are understandable to a blind person. A blind person who is reading braille, usually uses his or her fingers to run over the braille, and in this way is able to understand the meaning embedded in the raised dots. The braille may also be a type of symbol, such as symbol 120.

The media content presented is associated with the media disc in a format corresponding to the presentation option. The media content comprises at least one video content and an audio track corresponding to the selected option. At least one means that the media content may include video content, an audio track, or video content and an audio track corresponding to the selected option. Additionally, in an alternative embodiment, media content may comprise solely audio content. Solely audio content includes, without limitation, songs, musicals, plays, concerts. Solely audio content may also include, without limitation, spoken word stories, lectures, books on tape, documentaries, etc.

Figure 2:
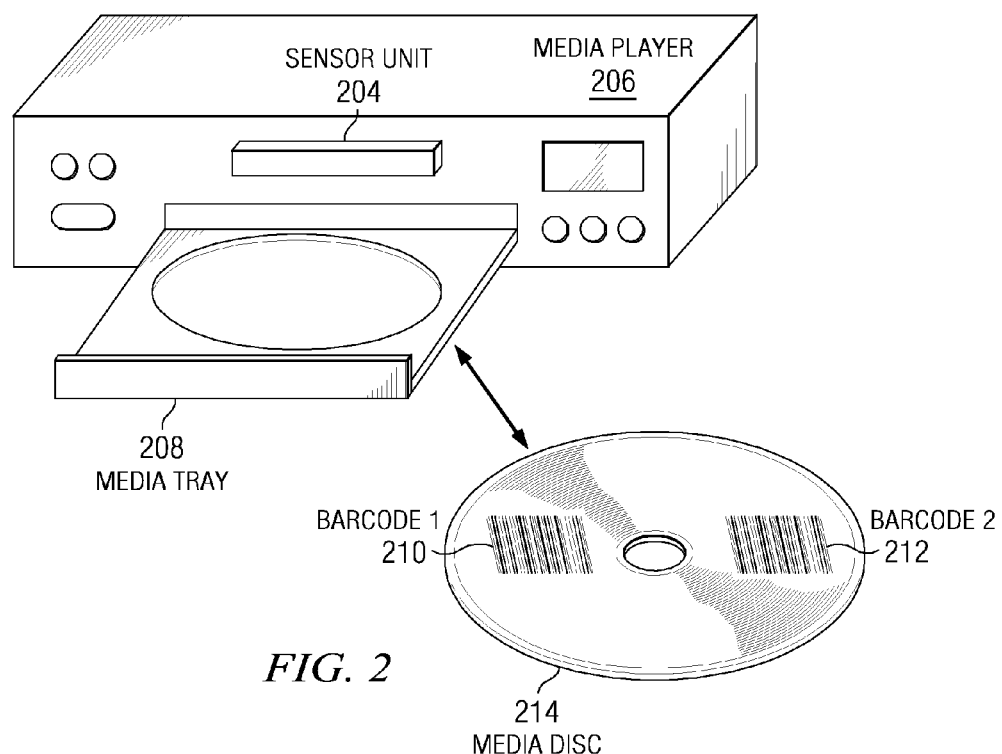
FIG. 2 is a diagram of a media player with a sensor unit in accordance with an illustrative embodiment.

FIG. 2 is pictorial diagram of a media player with a sensor unit attached to the media player in accordance with an illustrative embodiment. Media disc 214 is illustrative of a media disc that can be played in media player 206, such as media disc 118 in FIG. 1. Sensor unit 204 is attached to the top of media player 206. Sensor unit 204 is an example of sensor unit 104 as seen in FIG. 1. Sensor unit 204 may also be attached to various locations besides the top of media player 206. In this example, sensor unit 204 is a rectangular optical scanner that scans barcode 1 210 and barcode 2 212. However, sensor unit 204 may be multiple shapes, sizes and configurations according to the type of option identifier used. Additionally, sensor unit 204 may be separate from media player 206.

Media player 206 also contains media tray 208. Media tray 208 allows media disc 214 to be inserted and removed from media player 206. In this embodiment, media tray 208 slides to open and shut when activated.

Barcode 1 210 and Barcode 2 212 are examples of option identifier 122 as seen in FIG. 1. Barcode 1 210 and barcode 2 212 are associated with a specific option. A user would choose which barcode is associated with content corresponding to the presentation style desired by the user. In operation, the user may bring media disc 214 in proximity to sensor unit 204. This movement of media disc 214 allows sensor unit 204 to detect the appropriate barcode. Sensor unit 204 communicates with a controller, such as controller 108 in FIG. 1.

Once media tray 208 is closed, the contents of media disc 214 are presented on a display device, such as display device 114 in FIG. 1, and the contents automatically incorporate the option associated with either barcode 1 210 or barcode 2 212, depending on the user's selection.

Figure 3:
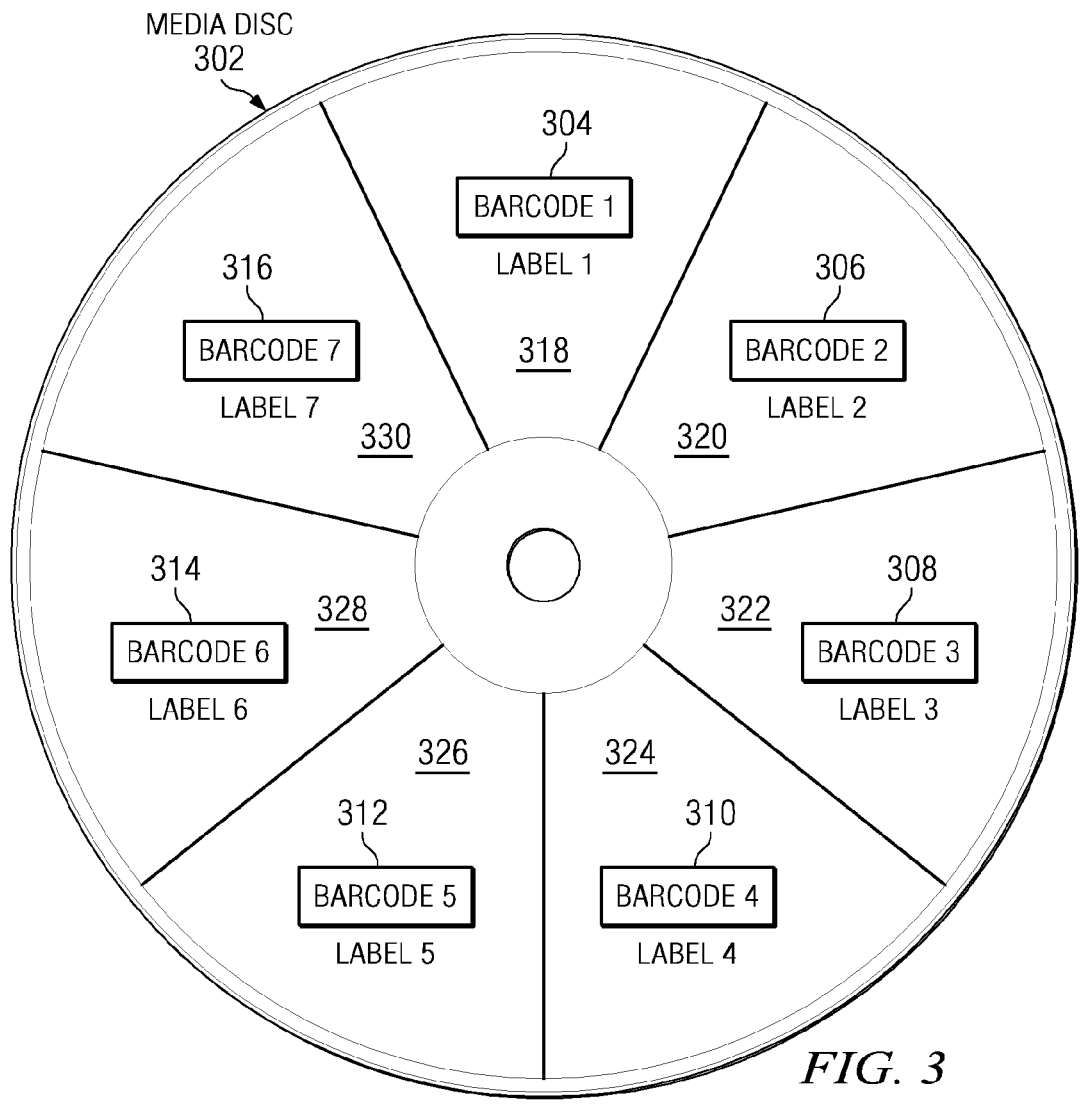
FIG. 3 is a diagram of a media disc containing an option identifier with language options in accordance with an illustrative embodiment.

Referring now to FIG. 3, a media disc containing option identifiers is illustrated in accordance with an illustrative embodiment. Media disc 302 is compatible with media player 106 in FIG. 1.

Media disc 302 contains barcode 1 304, barcode 2 306, barcode 3 308, barcode 4 310, barcode 5 312, barcode 6 314, and barcode 7 316. Barcodes 1-7 304-316 are examples of option identifier 122 in FIG. 1. Media disc 302 presents an embodiment of the present invention that allows media disc 302 to hold at least seven barcodes, where each barcode may be associated with a different option. In another embodiment, media disc 302 may contain any number of barcodes or other types of option identifiers that are associated with various options. The various options may be related to, for example, language and audio quality or language and image quality.

Media disc 302 may be, for example, without limitation a DVD or a CD. The options that may be located on the DVD or CD include, for example, without limitation, multiple episodes of a television series, multiple movies embedded on a DVD, and multiple songs on a CD. In one example, a viewer that wants to watch a specific episode, may do so by orienting the barcode corresponding to the particular episode in a manner that the barcode is detected by sensor unit 104 from FIG. 1.

Labels 1-7 318-330 are labels that indicate to the user an option associated with barcodes 1-7 304-316. In one embodiment, labels are located on the external surface of a media disc next to each barcode that the label corresponds to. This corresponding label indicates visually to the user the option associated with the barcode. Thus, the user is able to determine how to orient a media disc so that a sensor unit in a media player, such as sensor unit 104 in FIG. 1, is able to detect the barcode containing the desired option.

In FIG. 3 barcodes and labels cover the top surface of media disc 302. The top surface is the surface that is viewed by the user and positioned under a sensor unit, such as sensor unit 204 in FIG. 2. The bottom surface of media disc 302 is used by a media player to display the audiovisual content embedded in media disc 302. The barcodes may be located on the outer edge of media disc 302, on the inner edge of media disc 302, or directly on the external surface of media disc 302, since only the bottom surface of media disc 302 is used by a media player to read the data located on media disc 302. The barcodes may also be located on the inner edge of media disc 302, so as not to impede the readability of the data embedded on media disc 302.

Figure 4:
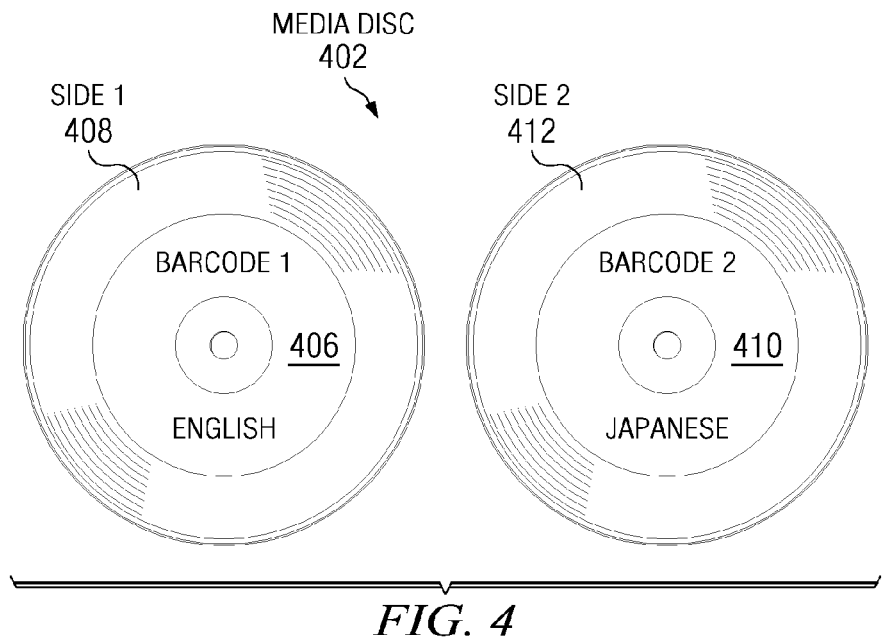
FIG. 4 is a diagram of a media disc including barcodes on opposite sides of the media disc in accordance with an illustrative embodiment.

Referring now to FIG. 4, a diagram of a media disc is depicted in accordance with an illustrative embodiment. Media disc 402 is a disc containing audio and/or video content, such as media disc 118 in FIG. 1. Side 1 408 represents one side of media disc 402. Side 2 412 indicates the reverse side of media disc 402.

Media disc 402 in this embodiment is capable of storing data on both sides of a media disc. Barcode 1 406 and barcode 2 410 are barcodes illustrative of option identifier 122 in FIG. 1. Barcode 1 406 indicates visually to the user the option corresponding to a specific language that a user may prefer. The English and Japanese text is an example of symbol 120 from FIG. 1.

In this example, if a user desires to view the contents located on media disc 402 in Japanese, then the user would load Side 2 412 on a media player, such as media player 106 in FIG. 1. Prior to loading, if the user was using the media player, such as media player 206 in FIG. 2, the user would bring the media disc in close physical proximity to the media player, so that media player 206 may detect barcode 1 406 and barcode 2 410 to display the audiovisual content stored on media disc 402 in Japanese. As previously indicated, the user may be visually alerted that barcode 2 410 plays the audiovisual content in Japanese by having creative artwork indicating a Japanese flag or, for example, Japanese lettering.

In FIG. 4, barcode 1 406 and barcode 2 410 are affixed to the center ring of Side 1 408 and Side 2 412 of media disc 402. The barcodes may be affixed by adhesive or etched or printed onto media disc 402. The barcodes are affixed to the center ring of media disc 402 so as not to impede the readability of the data embedded on media disc 402.

Figure 5:
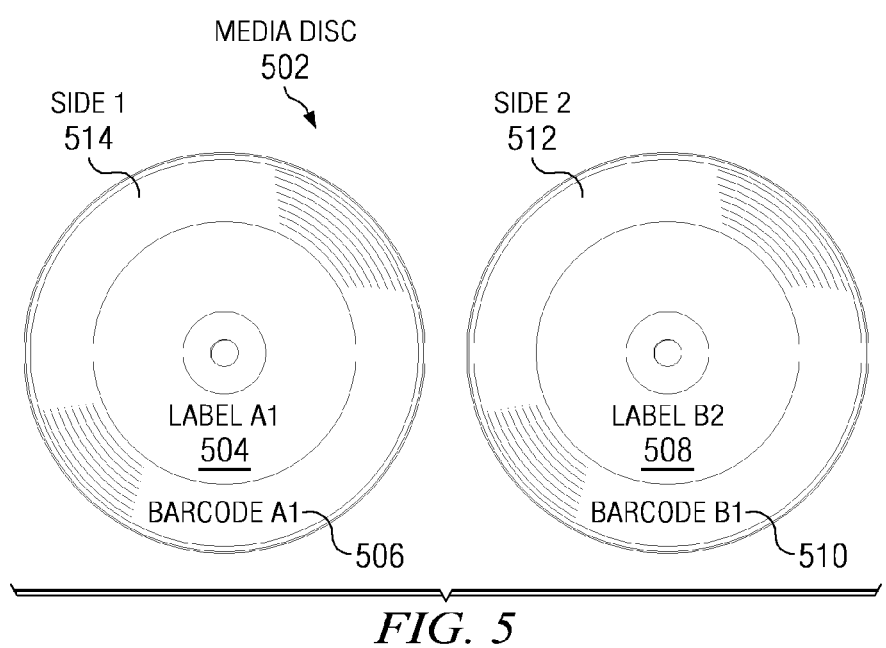
FIG. 5 is a diagram of a media disc with option identifiers in accordance with an illustrative embodiment.

Referring to FIG. 5, a diagram of a media disc with an option identifier is depicted in accordance with an illustrative embodiment. In this embodiment, barcode A1 506 and barcode B1 510 are located on the outer edge of media disc 502.

Additionally, label A1 504 and label B2 508 are labels that provide information about the contents of media disc 502. Label A1 504 and Label B2 508 also indicate the corresponding languages associated with barcode A1 506 and barcode B1 510. Label A1 504 and label B2 508 may comprise a combination of text, icons, symbols, or pictures that impart this information. For example, label A1 504 and label B2 508 may include a movie title and an illustration of a scene from a program or the actors in a movie located on media disc 502. Label A1 504 includes words describing a language corresponding to the program content located on the same side as label A1 504. Label B2 508 also includes words describing a language corresponding to the program content located on the same side as label B2 508. For example, label A1 504 may include the word "English", indicating that the program content located on side 1 514 is in English. Additionally, label B2 504 may include the word "Japanese" indicating that the program content located on side 2 512 is in Japanese. These same words, "English" or "Japanese", may appear in an alphabet corresponding to each language. Thus, for "Japanese", Label A1 504 includes Japanese alphabet characters to spell out the word "Japanese", as well as English alphabet characters that spell out the word "Japanese".

In one embodiment, labels included on media disc 502 include the English alphabet characters for the language associated with the stored content on a side of media disc 502 as well as any non-English alphabet characters that belong to the language associated with the stored content, that spell out the word for that non-English language.

FIG. 5 reflects that side 1 514 contains barcode A1 506 and label A1 504 on one side of media disc 502. Side 2 512 contains barcode B1 510 and label B1 508 on a reverse side of media disc 502. By locating two barcodes on either side of media disc 502, a viewer may see the same program content stored on media disc 502 in either language simply by scanning a side of media disc 502 corresponding to the viewer's desired language.

In one embodiment, barcode A1 506 corresponds to a first language and barcode B1 510 corresponds to another language. Thus, for example, if a viewer scans barcode A1 506, the contents of media disc 502 are displayed in English. However, if a viewer scans barcode B1 510, the contents of media disc 502 are displayed in Japanese.

Figure 6:
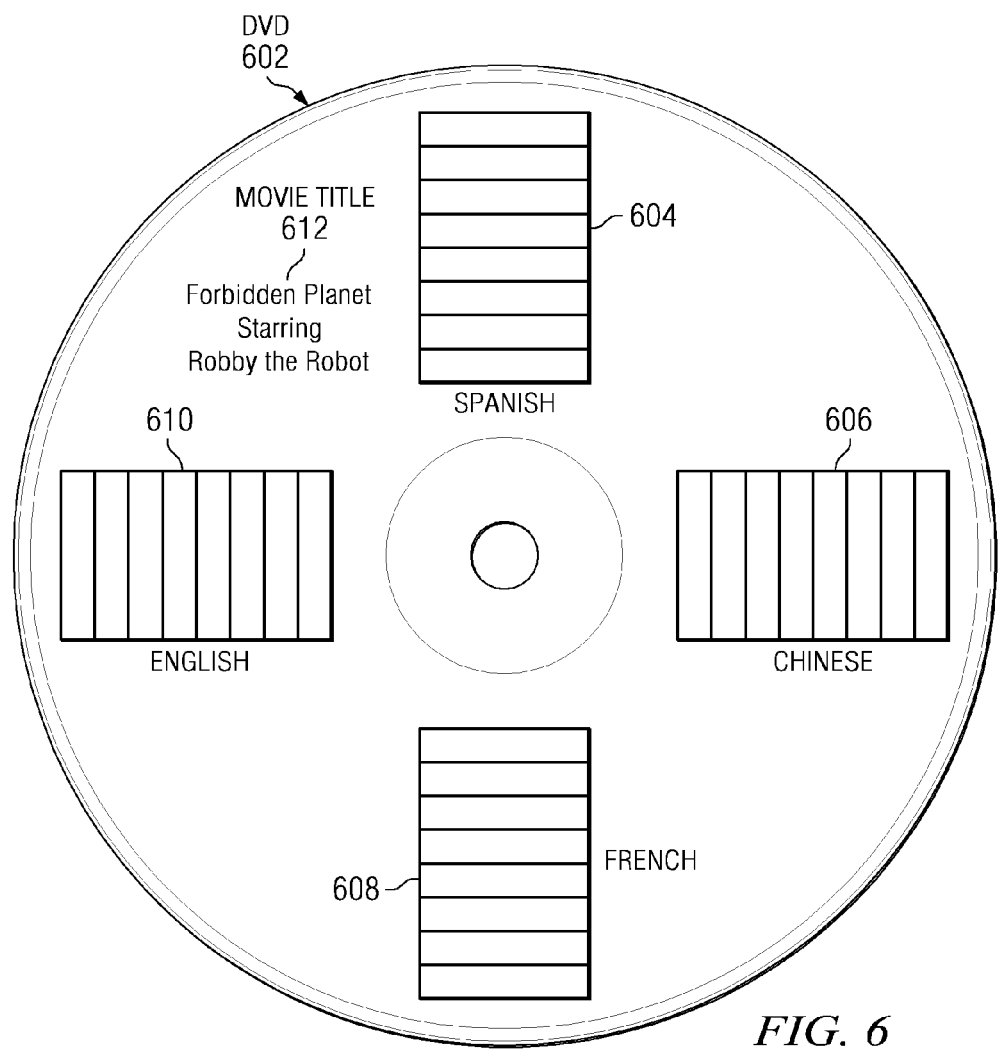
FIG. 6 is a diagram of a media disc in accordance with an illustrative embodiment.

FIG. 6 is a diagram of a media disc in accordance with an illustrative embodiment. DVD 602 is a media disc such as media disc 118 in FIG. 1. Movie title 612 corresponds to the movie embedded on DVD 602, which is displayed as the "Forbidden Planet, Starring Robby the Robot". This movie is also available to a viewer in four languages, which are indicated as Spanish 604, Chinese 606, French 608, and English 610. Spanish 604, Chinese 606, French 608, and English 610 are barcodes that may be scanned by a sensor unit, such as sensor unit 104 in FIG. 1. The movie would then be automatically presented in the language that the viewer desires on a display device, such as display device 114 in FIG. 1. In FIG. 6, the barcodes are located on a top surface that can further contain artwork relating to the movie stored on DVD 602.

Figure 7:
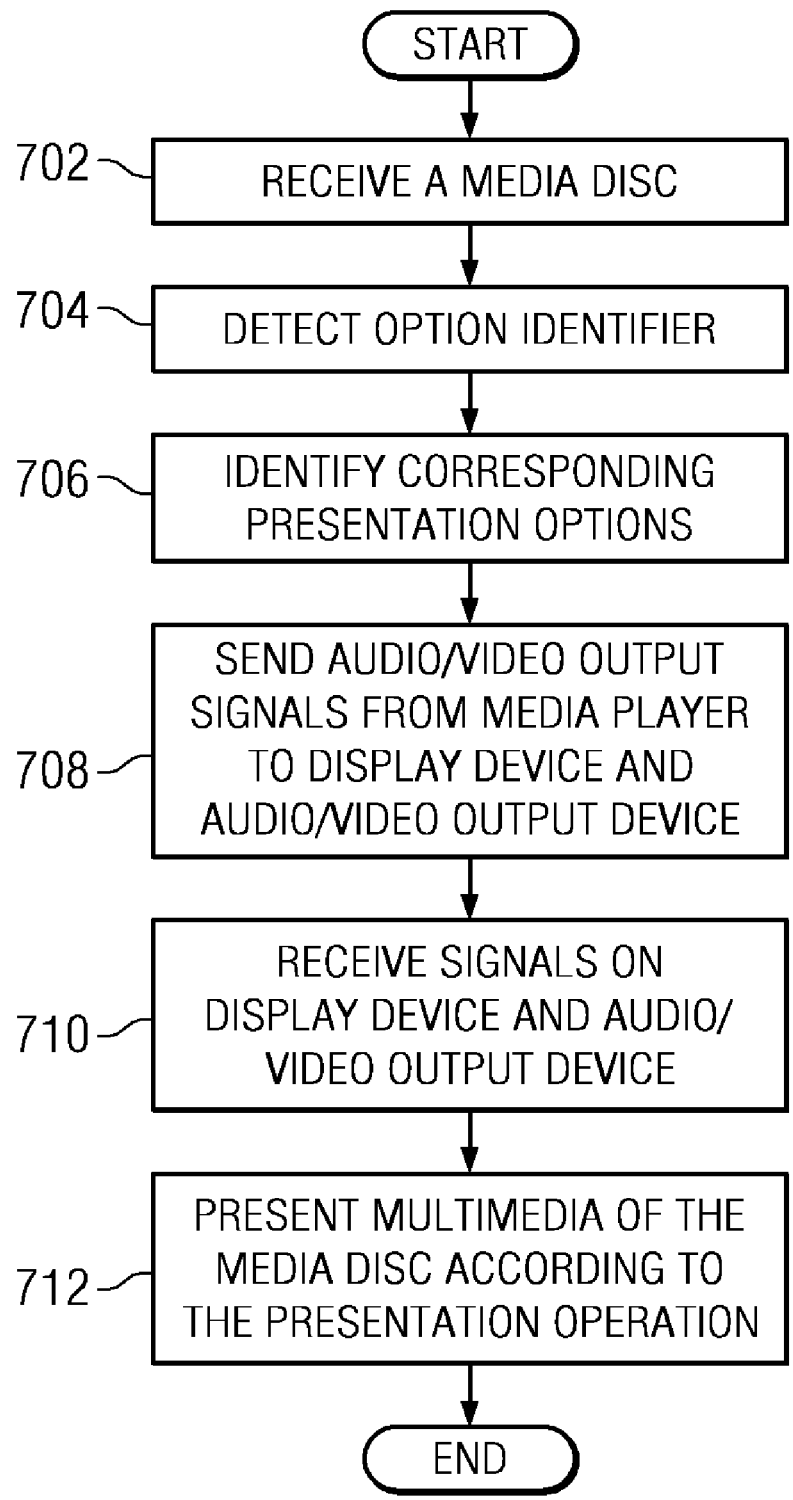
FIG. 7 illustrates a process for selecting options on a media player using an option identifier in accordance with an illustrative embodiment.

In FIG. 7, a flowchart illustrating a process for selecting options on a media player is depicted in accordance with an illustrative embodiment. The process is implemented by a media player for selecting options on a media disc, such as media player 106 and media disc 118 in FIG. 1.

The process starts by receiving a media disc (step 702). Next, the process detects an option identifier (step 704). The process then identifies corresponding presentation option(s) (step 706). The process then sends audio/video output signals from the media player to display device and audio/video output device (step 708). The process then receives signals on display device and audio/video output device (step 710). The process then presents multimedia of the media disc according to the presentation option (step 712). The process terminates thereafter.

The illustrative embodiments have been described as being implemented on a digital versatile device (DVD). However, the illustrative embodiments are not limited to digital versatile devices (DVD)'s. The method as presented may also be used in conjunction with compact discs, otherwise known as CD's, and video high speed tapes, otherwise known as VHS tapes. However, the method is not limited to these uses in any way.

Thus, the illustrative embodiments provide a method and apparatus for selecting options on a media disc containing data. In one embodiment, an option identifier is detected. The option identifier is located on a media disc. The option identifier is associated with a set of options, and the option identifier is located on an external surface of the media disc. Thus, the option identifier is visible to the user. The media disc is located in a media player. An option is selected corresponding to the option identifier and the option is executed in conjunction with the data on the media disc.

One or more features in the illustrative embodiments reduce or solve the problems associated with current media disc technology. One feature is automatic detection of a user preference or option based on an external option identifier located on a media disc. The illustrated embodiments provide for greater independence for the user who is unfamiliar with choosing options from the menu screen. The different illustrative embodiments provide the user with the choice to implement a feature based on an external option identifier indicating to the user which side of a media disc will instigate this option when presenting the data on a media disc.

Another feature of the illustrated embodiments allows for the manufacturers of media discs to attract a broader set of users, being that the media disc are easier for a user to adapt to his or her preferences or requirements. In essence, the added features to the media disc will entice more viewers to purchase and use the media disc since the features will be more relatable to the user and the steps for implementation are straightforward and simple to follow.

The flowchart and block diagrams in the figures track the architecture, functionality, and operation of possible implementations of systems, methods, and products according to various embodiments. In this regard, each block in the flowchart or block diagrams may represent a section that comprises one or more instructions for implementing the specified logical function(s). It should also be noted that, in some alternative implementation, the functions noted in the steps may occur out of the order noted in the figures. For example, two steps shown in succession may, in fact, be executed substantially concurrently, or the steps may sometimes be executed in reverse order, depending on the functionality involved.

The description of the present invention has been presented for purposes of illustration and description, and is not intended to be exhaustive or limited to the invention embodiments in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A method for selecting options on a media disc containing data, the method comprising:
    detecting an option identifier associated with an external surface of the media disc by a sensor unit coupled to a media player, wherein the sensor unit is unattached to the media player, and wherein the media disc includes a symbol located within a proximity of the option identifier that is a human readable indicating a presentation option corresponding to the option identifier, and wherein the presentation option is associated with closed captioning for hearing impaired people, and wherein the symbol is text written in alphabet characters corresponding to a language associated with the closed captioning for hearing impaired people, and wherein the external surface is an outer surface of the media disc, and wherein the option identifier is located on an outermost edge of the media disc, and wherein the media disc is dual sided;
    identifying the presentation option corresponding to the option identifier to form an identified presentation option; and
    presenting media content associated with the media disc in a format corresponding to the identified presentation option.

2. The method of claim 1, wherein the media content comprises at least one of video content and an audio track corresponding to a selected option, wherein the at least one of the video content and the audio track comprises one or more video content and one or more audio content, and wherein the option identifier is a barcode.

3. The method of claim 1, wherein the media disc is a digital versatile disc or a compact disc.

4. The method of claim 1, wherein the media disc is circular.

5. The method of claim 1, wherein the media disc contains a plurality of option identifiers, and wherein a first option identifier on a first side of the media disc is different from a second option identifier on a second side of the media disc.

6. An apparatus comprising:
    a media player, wherein the media player further comprises:
        a sensor unit coupled to the media player, wherein the sensor unit is unattached to the media player, and wherein the sensor unit detects an option identifier associated with an external surface of the media disc, and wherein the media disc includes a symbol located within a proximity of the option identifier that is a human readable indicating a presentation option corresponding to the option identifier, and wherein the presentation option is associated with closed captioning for hearing impaired people, and wherein the symbol is text written in alphabet characters corresponding to a language associated with the closed captioning for hearing impaired people, and wherein the external surface is an outer surface of the media disc, and wherein the option identifier is located on an outermost edge of the media disc, and wherein the media disc is dual sided;
    a controller coupled to the media player, wherein the controller identifies the presentation option corresponding to the option identifier to form an identified presentation option; and
    a display device connected to the media player, wherein the display device presents media content associated with the media disc in a format corresponding to the identified presentation option.

7. The apparatus of claim 6, wherein the media content comprises at least one of video content and an audio track corresponding to a selected option, and wherein the option identifier is a barcode.

8. The apparatus of claim 6, wherein the media disc is a digital versatile disc or a compact disc.

9. The apparatus of claim 6, wherein the media disc is circular.

10. The apparatus of claim 6, wherein the media disc contains a plurality of option identifiers, and wherein a first option identifier on a first side of the media disc is different from a second option identifier on a second side of the media disc.

11. A method for selecting options on a media disc containing data, the method comprising:
    detecting a barcode, associated with an external surface of a digital versatile disc containing audiovisual content using a sensor unit coupled to a media player, wherein the sensor unit is unattached to the media player, and wherein the digital versatile disc includes a symbol located within a proximity of the barcode that is a human readable indicating a presentation option corresponding to the barcode, and wherein the presentation option is associated with closed captioning for hearing impaired people, and wherein the symbol is text written in alphabet characters corresponding to a language associated with the closed captioning for hearing impaired people, and wherein the barcode is located on an outer rim of the digital versatile disc, and wherein the option identifier is located on an outermost edge of the digital versatile disc, and wherein the digital versatile disc is dual sided;
    identifying the presentation option corresponding to the barcode to form an identified presentation option; and
    presenting media content associated with the digital versatile disc in a format corresponding to the identified presentation option.

* * * * *